Feb. 3, 1970   E. R. HAIR ET AL   3,493,389
PROCESS FOR PREPARING INSTANT COFFEE
Filed Nov. 30, 1966

HUNTER COLOR SYSTEM

Hunter Color Co-ordinates of Light and Dark Colored Portions of Coffee

INVENTORS
Eddy R. Hair
David A. Strang

BY
ATTORNEYS

United States Patent Office 3,493,389
Patented Feb. 3, 1970

3,493,389
PROCESS FOR PREPARING INSTANT COFFEE
Eddy R. Hair, Colerain Township, Hamilton County, and David A. Strang, Springfield Township, Hamilton County, Ohio, assignors to The Procter & Gamble Company, Cincinnati, Ohio, a corporation of Ohio
Filed Nov. 30, 1966, Ser. No. 598,085
Int. Cl. A23f 1/08
U.S. Cl. 99—71                                1 Claim

ABSTRACT OF THE DISCLOSURE

Disclosed is a method of preparing an instant coffee product composed of agglomerated particles of light colored and dark colored instant coffees. The light colored coffee portion comprises from about 10% to about 50% by weight of the agglomerated product and the dark colored coffee portion comprises from about 50% to about 90% by weight of the agglomerated product. The light colored portion and the dark colored portion which are agglomerated to form a product having an appearance substantially similar to that portion of said product have Hunter Color values on the L scale differing by at least 5 units.

---

Figure 1:
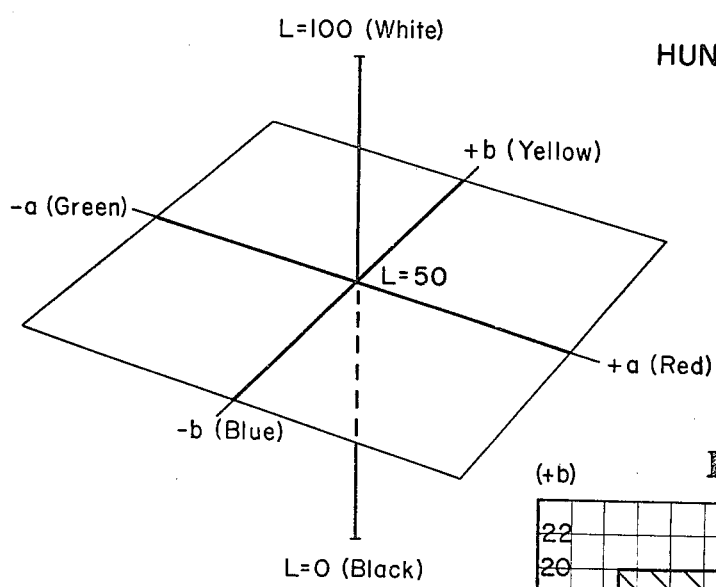

This invention relates to instant coffee. It deals with a unique instant coffee product which has an appearance resembling that of roast and ground coffee.

For many years producers of instant coffee have sought to eliminate the distinctions which consumers draw between instant and non-instant coffee products. The preponderance of this effort has gone into the area of flavor improvement. While absolute equality in the flavor of the beverages produced from the two types of coffee products has not been achieved, a substantial increase in consumer acceptance of the flavor of instant coffee has occurred in the last 10 to 15 years. Other physical characteristics, such as aroma, bulk density and particle size have been investigated in an attempt to make instant coffee more appealing to the consumers.

It has been found that a large number of consumers would prefer an instant coffee product which, in addition to having good coffee aroma and producing coffee beverage with brew-like flavor, has the physical appearance of roast and ground coffee. While some passing attention has been given to the production of darker instant coffee products to make them more coffee-like, little, if any, effort has been devoted to preparing instant coffee which has the physical appearance of roast and ground coffee.

Possibly the lack of effort in this area stems from the fact that the casual observer considers roast and ground coffee to be a uniformly colored product. However, careful inspection will reveal that this is not the case. Roast and ground coffee is composed of particles which appear to vary from a light brown to a dark reddish-brown in color. This appearance is caused by two factors: (a) actual color differences in the ground product generally caused by uneven roasting from the outside to the inside of the bean and from uneven roasting of different beans; and (b) apparent color differences caused by the reflection of light from various coffee particle surfaces when these surfaces differ in the angle they form with the line of sight of the observer.

It is an object of this invention to provide an instant coffee product which has the appearance of roast and ground coffee, and to provide a method for its preparation.

It is another object of this invention to provide instant coffee which contains two or more randomly intermixed portions of particles, each portion having a distinct color.

These and other objects are achieved by providing an instant coffee product which comprises a mixture of at least two portions of instant coffee particles, a light colored portion of instant coffee comprising from about 10% to about 50% by weight of the coffee product and having a color which is defined by Hunter Color values of: L scale, from about 25 to about 35; "a" scale, from about 5 to about 15; and "b" scale, from about 5 to about 20; and a dark colored portion of instant coffee comprising from about 25% to about 90% by weight of the coffee product and having a color which is defined by Hunter Color values of: "L" scale, from about 18 to about 30; "a" scale, from about 5 to about 15; and "b" scale, from about 5 to about 15; the light colored portion of instant coffee differing on the Hunter Color "L" scale from the dark colored portion of instant coffee by at least 5 units. Preferably, the light colored portion of instant coffee comprises from about 10% to about 20% by weight of the coffee product, and the dark colored portion comprises from about 60% to about 90% by weight of the coffee product. The balance of the instant coffee product, if any, consists of one or more additional portions of instant coffee particles having any conventional coffee color; as long as the color requirements for the above defined light and dark colored portions of instant coffee are met, the color of these additional portions of instant coffee is not critical. However, the light and dark colored portions of instant coffee as defined above are preferably the lightest and darkest colored portions in the coffee product.

The invention disclosed herein is frequently discussed in terms of only two portions of coffee particles. Such compositions form a preferred embodiment of this invention because of their comparative ease of preparation. When only two portions of instant coffee are used, the light colored portion can comprise from about 10% to about 50% by weight, and preferably about 10% to about 20% by weight, of the coffee product. The dark colored portion comprises the balance, i.e., from about 50% to about 90% by weight, and preferably from about 80% to about 90% by weight of the coffee product.

The Hunter Color system is a well-known means of defining the color of a given material. A complete technical description of the system can be found in an article by R. S. Hunter, "Phlotoelectric Color Difference Meter," Journal of the Optical Society of America, vol. 48, pp. 985–95, 1958.

Basically, the Hunter Color system can be described in terms of a three dimensional color solid. This solid contains all possible colors and has three perpendicular axes passing through its geometric center. The three axes contained in the Hunter Color solid are shown in accompanying FIGURE 1. The location of any point within the figure can be determined by reference to its co-ordinates on the three axes; therefore, any color can be defined in terms of the three co-ordinates.

In the Hunter Color system the vertical axis is designated the "L" scale and contains 100 equal units of division. Absolute black is at the bottom of the scale ($L=0$) and absolute white is at the top ($L=100$). As is shown in FIGURE 1, the two horizontal axes are designated respectively the "a" and "b" scales. The "a" scale intercepts the "L" scale at $L=50$; the "+a" portion of the "a" scale extends to the right of the "L" scale and "−a" to the left. Similarly the "b" scale intercepts the "L" scale at $L=50$ with "+b" extending behind the "L" scale and "−b" extending in front.

The "L" scale co-ordinate is a measure of relative lightness and darkness of the color whereas the "a" and "b" scale co-ordinates define the hue. The plane formed by the "a" and "b" scales forms in effect, an ordinary color wheel or, in other words, a circular color spectrum. Beginning with red on the "+a" scale, the spectrum runs counter clockwise passing through yellow at "+b," green at "−a," blue at "−b" and back again to red as "+a" is approached. The distance from the "L" scale on the "a" and "b" scales is a measure of color intensity. The least intense shades reside near the "L" scale, and the color becomes progressively more intense as the distance from the "L" scale increases.

The use of the Hunter Color system provides an accurate and reproducible means of color measurement. Techniques have been developed which permits the use of this color measurement system on materials of practically all shapes and sizes. Devices specifically designed for the measurement of color on the Hunter Color scales are described in United States Patent 3,003,388 to Hunter et al., issued Oct. 10, 1961.

Figure 2:
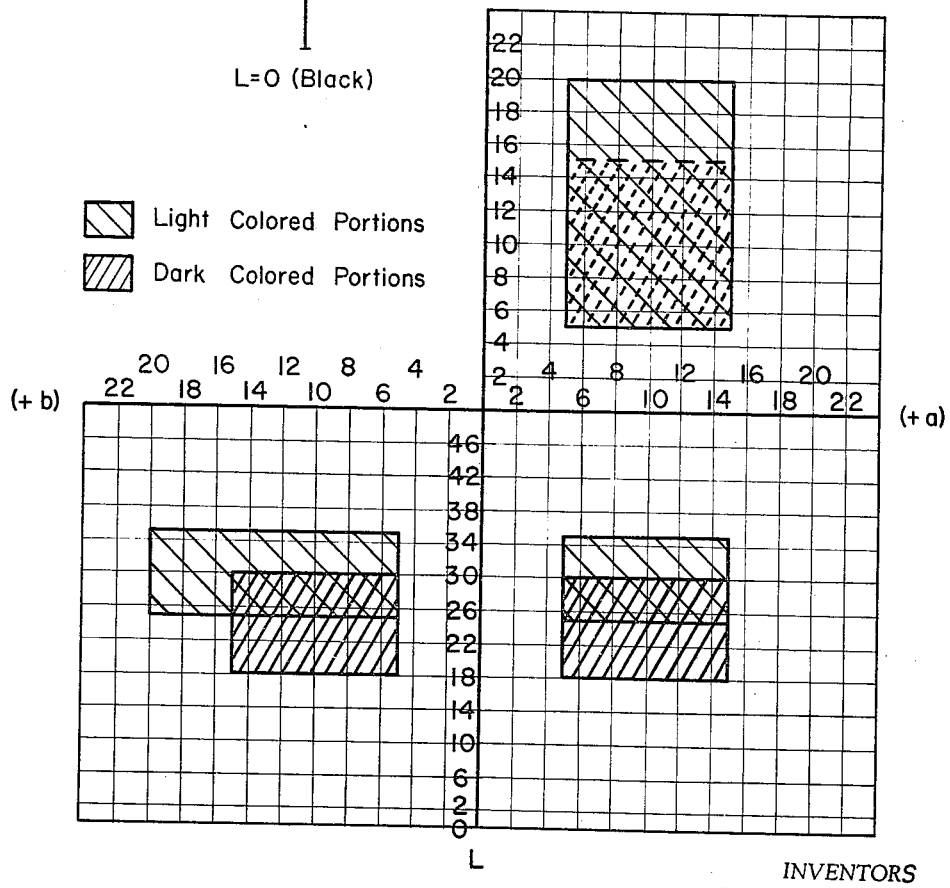

The area of color designated for the coffee particles disclosed herein is bounded by the "+a" and the "+b" axes between $L=0$ and $L=50$. These portions of the axes bound the lower right rear portion of the color solid of FIGURE 1. The pertinent portion of the color solid is shown in three-view form in accompanying FIGURE 2. FIGURE 2 also contains the orthographic projections of the parallelograms which define the areas of color for the portions of instant coffee use in the invention disclosed herein.

The rectangular solid bounded by the approximate values of $L=25$ to 35, $a=5$ to 15, and $b=5$ to 20, defines the light colored portion of instant coffee for use in the compositions of this invention. These "a" and "b" values, as well as all "a" and "b" values hereafter, are coordinates on the "+" portions of the scales. The parallelogram bounded by the approximate values of $L=18$ to 30, $a=5$ to 15, and $b=5$ to 15 defines the dark colored portion of instant coffee for use in the compositions of this invention. Darker, or "French," roasts may be simulated by using mixtures of instant coffees having "L" scale values at or near the lower limits in the above defined ranges. Conversely, "lighter" roasts may be simulated by using mixtures of instant coffees having "L" scale values at or near the upper limits. To achieve a roast and ground appearance in the instant coffee, the light and dark colored portions of instant coffee must differ by at least 5 units on the "L" scale. Preferably, they differ by at least about 7 units.

It has been found that the mixtures of instant coffee particles having the colors designated above have an appearance significantly more related to roast and ground coffee than prior art coffee compositions. Compositions of the type disclosed herein have been found to have significant consumer appeal. Products of particular appeal are produced when the light colored portion if instant coffee has a color which is defined by Hunter Color values of: "L" scale, from about 29 to about 32; "a" scale, from about 9 to about 11; and "b" scale, from about 13 to 16; and the dark colored portion of the instant coffee has a color which is defined by Hunter Color values of: "L" scale, from about 21 to about 25; "a" scale, from about 7 to about 9; and "b" scale, from about 9 to about 11; and the light colored portion of instant coffee differs on the Hunter Color "L" scale from the dark colored portion of instant coffee by at least 5 units.

Coffee particles used in the instant coffee products of this invention can be prepared by any convenient process. Conventionally, instant coffee is prepared by roasting and grinding a blend of coffee beans, extracting the roast and ground coffee with water to form an aqueous coffee extract, and drying the extract to form the instant coffee product. Various techniques, the most important of which are discussed below, allow the removal and preservation of the more fugitive coffee flavor materials, and their subsequent readdition to the coffee product in a manner wherein they are not destroyed.

Typical roasting equipment and methods for roasting coffee beans are described, for example, in Sivetz & Foote, "Coffee Processing Technology," Avi Publishing Co., Westport, Conn., 193, vol. 1, pp. 203–26. Coffee oil is often expelled from a portion of the roasted beans prior to grinding. The oil, which contains a significant amount of high quality coffee flavor and aroma constituents, is chilled to about 20° F. or less and saved for addition to the dry, instant coffee product generally immediately prior to packaging. The coffee beans which have not been oil expelled are ground, preferably to a United States Standard Screen size of from about 8 mesh to about 20 mesh. Typical oil expelling equipment is described, for example, in Sivetz, "Coffee Processing Technology," Avi Publishing Co., Westport, Conn., 1963, vol. 2, pp. 27–30; typical grinding equipment is described, for example, in Sivetz & Foote, supra, pp. 239–50.

While numerous types of continuous or batch extraction systems can be used, the most commonly used system for the extraction of roast and ground coffee is a multi-column extraction train. This system is composed of a number of elongated extraction columns connected in series for continuous counter-current operation. While in these columns, and prior to extraction, the roast and ground coffee can be distilled to remove a volatile flavor fraction, and the flavor fraction can be condensed. The distillation often is accomplished by passing steam through the coffee column for from about 10 to about 45 minutes. The condensate can be added immediately to a previously obtained extract; if not, it should be chilled to about 20° F. or less and maintained at that temperature until such time as it is added to an extract.

Once the distillation operation is completed, the coffee is extracted by admitting hot water, such as from about 320° F. to about 375° F., to the last column of the extraction train. The temperature is allowed to decrease by natural heat losses as it passes through the system, and is withdrawn from the column containing the freshest (previously unextracted) roast and ground coffee at a temperature of from about 190° F. to about 230° F. Typical disclosures of equipment and methods which can be used in the above operations are as follows: steam distillation—Sivetz, supra, pp. 43–46, and United States Patent 2,562,206 to Nutting, issued July 31, 1951; extraction—Sivetz & Foote, supra, pp. 261–378, and United States Patent 2,515,730 to Ornfelt, issued July 18, 1950.

Once the coffee extract has been obtained, it is preferable for the extract to be concentrated to at least about 45% by weight coffee solubles. This concentration step is particularly beneficial for extracts which contain a previously obtained distillate. The high concentration of coffee solubles helps to preserve the fugitive coffee flavor materials from deterioration. Concentration can be by any conventional method, such as freeze concentration, thin film evaporation and flashing, or by the addition of previously dried coffee powder. The extract is then dried.

The color of the final instant coffee product is heavily influenced by the method and operating conditions of the drying operation. While any convenient drying method can be used, the most common drying method is spray drying. Proper control of the spray drying conditions will enable production of instant coffees having colors within the full ranges designated above for use in this invention.

As a general rule, relatively light colored spray dried instant coffee has a lower bulk density and is composed of larger, thin walled particles than its darker counterparts. Some factors which tend to favor formation of lighter colored spray dried particles are low extract densities, moderate atomizing pressures during drying, and the use of high temperature air in drying. In addition, lighter color also can be promoted by the use of lighter colored roasted beans and the presence of a high concentration of hydrolysis products in the extract. These hydrolysis products are obtained by the use of high extraction temperatures.

Conversely, relatively dark spray dried instant coffee particles generally have higher bulk density and are composed of smaller particles with thick walls than lighter colored spray dried coffee. Spray drying conditions which tend to influence the formation of this type of particle are high density extracts, moderately higher spraying pressures, and the use of lower temperature air in drying. Other factors which tend to give darker products are the use of darker roasted beans, and the presence of excess fatty acids in the extract.

The average skilled worker in the art can readily vary one or more of the above operating parameters in drying of coffee extracts and produce coffee products having the desired color characteristics. The vast number of variables makes available a large number of drying processes which are capable of producing the desired results.

However, some drying processes produce the desired product with a greater degree of consistency and color reproducibility. For these reasons the preferred spray drying operation for producing the light colored portion of instant coffee for use in the compositions of this invention, as defined above, is by atomizing at moderate pressures (about 300 p.s.i.g. to about 400 p.s.i.g.) an extract (about 35% to about 50% by weight coffee solubles in water) of low density (about 0.5 to about 0.9 gm./cc. at 75° F.) using moderate air temperatures in the drying tower (from about 450° F. to about 500° F. inlet, and from about 230° F. to about 270° F. outlet).

Similarly, the preferred spray drying operation for producing the dark colored portion of instant coffee for use in the compositions of this invention, as defined above, is by atomizing at moderately high pressures (about 450 p.s.i.g. to about 600 p.s.i.g.) a high concentration extract (about 45% to about 60% by weight coffee solubles in water) of high density (from about 1.1 to about 1.2 gm./cc. at 75° F.) using moderate air temperatures in the drying tower (from about 450° F. to about 500° F. inlet, and from about 230° F. to about 270° F. outlet).

Generally, the light and dark colored portions of instant coffee are spray dried separately, and then are mixed prior to packaging for shipment and sale. Alternatively, a spray drying tower can be equipped with a plurality of spray nozzles and two or more separate extracts sprayed simultaneously to produce a mixture of the portions of instant coffee without the need for a separate mixing operation.

In a particularly preferred embodiment of this invention, one of the portions of instant coffee is freeze dried. Freeze dried instant coffee is prepared by freezing a coffee extract prepared as described above. The frozen extract, granulated if desired, then is placed in a chamber under vacuum (preferably less than 500 microns of mercury absolute pressure) and maintained at low temperatures (preferably less than −15° F.). Heat then is applied to remove water from the frozen extract by sublimation. Processes of this type are often capable of achieving excellent flavor retention during drying.

The freeze dried portion of the present compositions can be either the light or the dark colored portion, but preferably it is the light colored portion. The color of the freeze dried product can be controlled conveniently by varying the rate at which the extract is frozen. As the freezing rate increases the color of the final freeze dried product becomes lighter. For example if a coffee extract is placed in a freezing tray to a depth of about ¼ inch, and then rapidly frozen by placing the tray in a freezing chamber having a temperature of about −50° F., the freeze dried product will have a light brown color within the range of the light colored portion of instant coffee as defined above. When the same process is repeated and the extract is frozen using a freezing chamber temperature of about −5° F., the freeze dried product will have a darker brown color within the range of the darkest portion of instant coffee as defined above. Further, these two freeze dried products will differ on the Hunter Color L scale by at least 5 units.

The type of freeze drying equipment which is used in preparing the freeze dried coffee described above is not a limitation upon this invention. Many manufacturers produce commercial and laboratory size freeze dryers which are useful in preparing freeze dried coffee. Any of such dryers can be used in the practice of this invention. Similarly, the specific process conditions used in producing the freeze dried coffee is not a limitation upon this invention. Freeze dried coffee for use in the compositions disclosed herein can be prepared by any known freeze drying process.

Typical disclosures relating to processes and equipment for freeze drying can be found, for example, in Copley and Van Arsdel, "Food Dehydration," Avi Pub. Co., Westport, Conn., 1964, vol. II, pp. 105–31, Perry, "Chemical Engineers' Handbook," McGraw-Hill Book Co., New York, 4th ed., 1963, pp. 17–26 to 17–28, Tressler and Evers, "The Freezing Preservation of Foods," Avi Pub. Co., Westport, Conn., vol. 1, pp. 612–26, and in United States Patent 2,751,687 to Colton, issued June 26, 1956.

Mixtures of spray dried and freeze dried coffee in the composition of this invention are preferred because of the greater brew-like coffee flavor which is given to the final product. Surprisingly it has been found that substantially greater increases in flavor are achieved by the addition of freeze dried coffee to spray dried coffee than would be expected from the relative amounts of each which are used. For example, when an expert panel tasted various combinations of spray dried and freeze dried coffee, it was found that the flavor of a combination composed of about 50% by weight freeze dried coffee and about 50% by weight spray dried coffee was substantially indistinguishable from that of 100% freeze dried coffee. Further it was found that about 50% of the flavor increase achieved by the addition of freeze dried coffee to spray dried coffee was achieved by a blend of about 10% by weight freeze dried and about 90% by weight spray dried coffee. For this reason, preferred spray dried-freeze dried instant coffee mixtures of this invention contain at least about 10% by weight freeze dried instant coffee; most preferably, the freeze dried coffee comprises from about 10% by weight to about 50% by weight of the mixture.

Spray dried instant coffee typically has a size distribution wherein about 60% by weight of the coffee is from about 40 mesh to about 80 mesh, United States Standard Screen sizes. Freeze dried coffee can be prepared in nearly any size range desired, from that of spray dried coffee up to approximately the size of conventional roast and ground coffee, or even larger. In a preferred embodiment of this invention, all or part of the instant coffee particles which are less than about 40 mesh United States Standard Screen size are increased in size to approximately the size of roast and ground coffee sold for the production of fresh brewed coffee; roast and ground coffee typically has a size distribution wherein about 70% by weight of the coffee is from about 12 to about 30 mesh United States Standard Screen size. In this manner, the overall appearance of the instant coffee of this invention more closely simulates the appearance of the roast and ground coffee. While the size increase can be accomplished in a number of ways, a preferred method is by agglomeration. Regardless of the manner chosen to accomplish the size increase, this operation must be performed on each portion of instant coffee separately prior to mixing of the different colored portions. This prevents the blending of different colored small particles into a single larger particle; distinctively colored instant coffee compositions of this type are disclosed and claimed in the copending United States Patent Application of Hair, Ser. No. 598,004, filed Nov. 30, 1966.

Agglomeration can be accomplished by the use of equipment and methods well known in the art, such as those described in United States Patent 2,413,693 to Derfler, issued Jan. 7, 1947.

After completion of the drying operations (as well as any agglomerating, if used) the dried powders are mixed in preparation for packaging, shipment and sale. Mixing can be accomplished in any conventional mixer, such as a rotating drum or a fluidized bed, which will provide reasonable interblending without undue attrition of the particles. Prior to packaging, any coffee oil which has been expelled is sprayed onto the dried powder, preferably immediately before packaging and under an inert atmosphere.

The following examples are given to demonstrate the preparation of distinctly colored instant coffee products within the scope of this invention. However, these examples are not intended to be limitations upon the invention. Unless stated to the contrary, all ratios and percentages in these examples are on a weight basis.

EXAMPLE I (A) Five thousand pounds of roast and ground coffee (100% by weight through No. 8 mesh and 95% by weight on No. 20 mesh United States Standard screens) was used to prepare an aqueous coffee extract in a conventional countercurrent extraction train. The extraction train was composed of eight stainless steel columns connected in series for continuous operation. Each column was fifteen feet high, eight inches in diameter and held approximately 450 pounds of the roast and ground coffee. Prior to extraction a volatile flavor fraction was distilled from the roast and ground coffee by passing 10 p.s.i.g. steam through each column of fresh coffee for fifteen minutes. The volatile fraction removed from the coffee was passed into a 35° F. condenser and then into a −110° F. cold trap. The total weight of condensate obtained was 10% by weight of the roast and ground coffee which was steamed. The condensate was saved for addition to a liquid extract as described below.

The steam distilled roast and ground coffee was then extracted countercurrently with water. The water entered the extraction system at 300° F. and was allowed to cool by natural heat losses as it passed through the system. The extract emitting from the last column had a temperature of 210° F. and a concentration of coffee solubles of 22% by weight.

A 60% by weight segment of the final extract was spray dried in a conventional spray tower, fourteen feet in diameter and thirty-five in height. The extract was atomized at a pressure of 550 p.s.i.g. and sprayed into a concurrent flow of hot air. The inlet temperature of the air was 560° F. and the outlet temperature was 260° F.

(B) A 25% by weight segment of the extract obtained in Part A, above, was concentrated by the addition of a portion of the spray dried solids, also prepared in Part A. Sufficient spray dred solids were used to produce a coffee solubles content of 50% by weight (density=1.2 gm./cc. at 70° F.). This concentrated extract was spray dried in the same tower described in Part A to produce dark brown coffee granules. The atomizing pressure was 550 p.s.i.g.; the air inlet temperature was 480° F. and the air outlet temperature was 240° F. The Hunter Color coordinates for this spray dried powder were determined using a Hunterlab D-25 Color Difference Meter. The results were: $L=23.3$, $a=8.5$ and $b=10.3$. Five pounds of this powder was used in the preparation of instant coffee compositions within the scope of this invention, as fully described in Part C, below.

Three pounds of the remaining 15% by weight of extract, one pound of condensate, and sufficient spray dried solids, all prepared in part A, above, were mixed in a two liter flask to produce a coffee extract having a coffee solubles concentration of 25% by weight. This extract was poured in eight inch by twelve inch stainless steel freezer trays to a depth of one-quarter inch. The trays were then suspended in a Dry Ice-acetone bath having a temperature of −30° F. After fifteen minutes, the frozen slabs were removed from the trays and hand granulated to approximately one-quarter inch pieces. The frozen granules, at a loading factor of 0.8 pound per square foot, were placed in the trays of a Repp Industries, Inc., "Sublimator 40" laboratory scale freeze drier. The pressure was reduced to 150 microns of mercury absolute, and radiant heat was applied to remove the frozen water from the product by sublimation. The maximum coffee particle temperature during drying was 105° F. After 8½ hours drying was complete and the freeze dried particles were withdrawn from the freeze drier. The freeze dried particles then were further reduced in size by forcing the particles through a United States Standard 12 mesh screen. The Hunter Color coordinates of these light brown coffee particles were obtained using the same Color Difference Meter as above. The coordinates were: $L=30.7$, $a=11.0$ and $b=14.6$.

(C) The spray dried and freeze dried powders obtained in Part B, above, were then mixed by hand in the following proportions to prepare a one pound sample of each mixture of instant coffee: (1) 80% by weight spray dried and 20% by weight freeze dried; and (2) 90% by weight spray dried and 10% by weight freeze dried. Since the light and dark colored portions differed by at least five units on the Hunter Color "L" scale, the appearance of both of these mixtures resembled that of fine ground roasted coffee.

EXAMPLE II (A) An extract of roast and ground coffee was prepared in the same manner as described in Example I, Part A. The concentration of coffee solubles in the extract was 24% by weight. A 70% by weight segment of this extract was spray dried in the spray tower described in Example I, Part A. The atomizing pressure was 530 p.s.i.g. and the air inlet and outlet temperatures were 520° F. and 260° F. respectively. These spray dried solids were returned to the remaining 30% by weight segment of the original extract to produce a concentrated extract with a 49% by weight concentration of coffee solubles (density=1.15 gm./cc.).

(B) An 85% by weight segment of the concentrated extract from Part A above, was spray dried in the same tower as described in Example I, Part A, using an atomizing pressure of 530 p.s.i.g. and air inlet and outlet temperatures of 470° F. and 220 F. respectively. The Hunter Color coordinates of this dark brown coffee powder were measured with a Hunterlab D-25 Color Difference Meter, and the results were: $L=21.7$, $a=7.0$ and $b=9.3$.

The remaining 15% by weight of the concentrated extract was then aerated to produce a density of 0.65% gm./cc. This aerated extract was spray dried in the same tower as described above using an atomizing pressure of 400 p.s.i.g. and air inlet and outlet temperatures of 460° F. and 220° F., respectively. The Hunter Color coordinates were: $L=30.4$, $a=10.5$ and $b=15.6$. This second powder was noticeably lighter in color than the spray dried powder described in the preceding paragraph.

(C) The two spray dried powders from Part B of this example were mixed by hand in the following proportions to prepare one pound samples of each mixture of instant coffee: (1) 83% by weight dark colored powder to 17% by weight light colored powder; (2) 85% by weight dark colored powder to 15% by weight light colored powder; and (3) 87% by weight dark colored powder to 13% by weight light colored powder. Since the light and dark colored portions differed by at least five units on the Hunter Color "L" scale, each of these three samples had the appearance of finely ground roast coffee.

EXAMPLE III (A) An extract of roast and ground coffee was prepared in the same manner as Example I except that the inlet and outlet temperatures of the extraction system were 340° F. and 212° F., respectively. The concentration of coffee solubles in the extract was 25.7% by weight. An approximate 85% by weight segment of this extract was dried in the spray tower described in Example I, Part A. Atomizing pressure was 350 p.s.i.g. and the air inlet and outlet temperatures were 520° F. and 250° F., respectively. The Hunter Color coordinates of this dark brown coffee powder were measured as described in Example 1, Part B and the results were as follows: $L=25.9$, $a=10.1$ and $b=12.1$.

A sufficient amount of this dry powder was added to the remaining 15% by weight segment of the extract to bring the coffee solubles concentration to 47% by weight. This concentrated extract was then aerated to produce an extract density of 0.70 gm./cc. The aerated extract was dried in the same tower as above, using an atomizing pressure of 450 ps.i.g. and air inlet and outlet temperatures of 480° F. and 230° F., respectively. The Hunter Color coordinates of this lighter colored powder were: $L=31.4$, $a=10.3$ and $b=15.3$.

(B) The two spray dried powders were then mixed by hand in the following proportions to form one pound samples of instant coffee: (1) 50% by weight dark colored powder and 50% by weight light colored powder; (2) 75% by weight dark colored powder and 25% by weight light colored powder. Since the light and dark colored portions differed by at least five units on the Hunter Color "L" scale, both of these samples were found to resemble finely ground roast coffee.

EXAMPLE IV

A series of instant coffee samples are prepared using the spray-dried powder of Example I, Part B ($L=23.3$, $a=8.5$, $b=10.3$), the spray dried powder of Example III, Part A ($L=25.9$, $a=10.1$, $b=12.1$), and the spray dried powder of Example II, Part B ($L=30.4$, $a=10.5$, $b=15.6$). Each sample weighs one pound. The composition of the samples is given in the following table.

| Sample | Weight percent instant coffee having Hunter Color Coordinates of— | | |
|---|---|---|---|
| | $L=23.3, a=8.5, b=10.3$ | $L=25.9, a=10.1, b=12.1$ | $L=30.4, a=10.5, b=15.6$ |
| 1 | 80 | 10 | 10 |
| 2 | 60 | 30 | 10 |
| 3 | 40 | 10 | 50 |
| 4 | 25 | 55 | 20 |

Each of the above samples is found to resemble finely ground roast coffee.

What is claimed is:

1. The method of preparing an instant coffee product having the appearance of roast and ground coffee, said product comprising a light colored portion and a dark colored portion, said method comprising:
 (a) Preparing an aqueous coffee extract having a solubles concentration of from about 35% to about 50% by weight, said extract having a density of from about 0.5 gram/cc. to about 0.9 gram/cc.; and thereafter,
 (b) Spray drying said extract at moderate spray pressures of from about 300 p.s.i.g. to about 400 p.s.i.g. at a moderate air inlet temperature of from about 450° F. to about 500° F., and at moderate air outlet temperature of from about 230° F. of about 270° F.; whereby a light colored portion of instant coffee is produced having a color which is defined by Hunter Color values of: "L" scale, from about 25 to about 35; "a" scale from about 5 to about 15; and "b" scale from about 5 to about 20; and
 (c) Preparing an aqueous high concentration extract having a solubles concentration of from about 45% to about 60% by weight, said extract having a density of from about 1.1 grams/cc. to about 1.2 grams/cc.; and thereafter,
 (d) Spray drying said extract at moderately high spray pressures of from about 450 p.s.i.g. to about 600 p.s.i.g. and at moderate air inlet temperatures of from about 450° F. to about 500° F., and at moderate air outlet temperatures of from about 230° F. to about 270° F.; whereby a dark colored portion of instant coffee is produced having a color which is defined by Hunter Color values of: "L" scale from about 18 to about 30; "a" scale from about 5 to about 15; and "b" scale from about 5 to about 15; said dark colored portion of instant coffee differing from said light colored portion of instant coffee on the Hunter Color "L" scale by at least units; and thereafter,
 (e) Mixing said light colored portion of instant coffee and said dark colored portion of instant coffee to provide an instant coffee product having the appearance of roast and ground coffee, said light colored portion comprising from about 10% to about 50% by weight of said porduct; and said dark colored portion comprising from about 50% to about 90% by weight of said product.

References Cited

UNITED STATES PATENTS

| 2,788,276 | 4/1957 | Reich | 99—71 |
| 2,897,084 | 7/1959 | Peebles | 99—71 |
| 3,244,533 | 4/1966 | Clinton et al. | 99—71 |

OTHER REFERENCES

Sivetz et al.; Coffee Processing Technology, pp. 497–501, vol. 1, Avi. Pub. Co., Westport, Conn., 1963.

MAURICE W. GREENSTEIN, Primary Examiner

PO-1050
(5/69)

UNITED STATES PATENT OFFICE
CERTIFICATE OF CORRECTION

Patent No. 3,493,389        Dated February 3, 1970

Inventor(s) Eddy R. Hair and David A. Strang

It is certified that error appears in the above-identified patent and that said Letters Patent are hereby corrected as shown below:

Abstract of the Disclosure

A method of preparing an instant coffee product havin the appearance of roast and ground coffee, said product comprising a light-colored portion of instant coffee and a dark-colored portion of instant coffee, said light-colored portion comprising from 10% to 50% by weight of the product and said dark-colored portion comprising from 50% to 90% by weight of the product.

SIGNED AND
SEALED
JUL 7 1970

(SEAL)
Attest:

Edward M. Fletcher, Jr.
Attesting Officer

WILLIAM E. SCHUYLER, JR.
Commissioner of Patents